(12) United States Patent
Yamaguchi

(10) Patent No.: US 10,198,868 B2
(45) Date of Patent: Feb. 5, 2019

(54) INFORMATION PROCESSING APPARATUS, METHOD FOR CONTROLLING INFORMATION PROCESSING APPARATUS, IMAGE PROCESSING SYSTEM AND NON-TRANSITORY COMPUTER-READABLE STORAGE MEDIUM

(71) Applicant: CANON KABUSHIKI KAISHA, Tokyo (JP)

(72) Inventor: Hiroichi Yamaguchi, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/158,869

(22) Filed: May 19, 2016

(65) Prior Publication Data

US 2016/0350976 A1 Dec. 1, 2016

(30) Foreign Application Priority Data

Jun. 1, 2015 (JP) .................................. 2015-111680

(51) Int. Cl.
*G06T 19/00* (2011.01)
*G06T 19/20* (2011.01)
(Continued)

(52) U.S. Cl.
CPC .......... *G06T 19/006* (2013.01); *G02B 27/017* (2013.01); *G06T 19/20* (2013.01);
(Continued)

(58) Field of Classification Search
None
See application file for complete search history.

(56) References Cited

U.S. PATENT DOCUMENTS 7,940,295 B2 5/2011 Takayama
2006/0227209 A1 10/2006 Takayama
(Continued)

FOREIGN PATENT DOCUMENTS

CN 101295206 A 10/2008
CN 101324433 A 12/2008
(Continued)

OTHER PUBLICATIONS

Combined Search and Examination Report issued in Great Britain Patent Application No. GB1609331.2 dated Nov. 28, 2016.
(Continued)

*Primary Examiner* — Ke Xiao
*Assistant Examiner* — Jed-Justin Imperial
(74) *Attorney, Agent, or Firm* — Rossi, Kimms & McDowell LLP

(57) ABSTRACT

An information processing apparatus comprises a luminance value obtaining unit for respectively obtaining first and second luminance values of first and second captured images of a physical space, wherein the first and second captured images are respectively captured by first and second image capturing units; a parameter obtaining unit for respectively obtaining first and second tracking parameters of automatic exposure control corresponding to a change in brightness of the physical space for the first and second image capturing units; and a setting unit for setting a first image capturing parameter for the first image capturing unit based on the first luminance value and the obtained first tracking parameter and a second image capturing parameter for the second image capturing unit based on the second luminance value and the obtained second tracking parameter.

12 Claims, 16 Drawing Sheets

(51) Int. Cl.
*H04N 5/253* (2006.01)
*G02B 27/01* (2006.01)
*H04N 5/235* (2006.01)

(52) U.S. Cl.
CPC ......... *H04N 5/2351* (2013.01); *H04N 5/2353* (2013.01); *G02B 2027/0118* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 2008/0266386 A1* | 10/2008 | Maeda | G06F 3/012 348/47 |
| 2009/0022365 A1* | 1/2009 | Kotake | G06K 9/32 382/103 |
| 2012/0281101 A1* | 11/2012 | Fujinawa | H04N 1/00127 348/207.1 |
| 2013/0326364 A1 | 12/2013 | Latta et al. | |
| 2014/0160001 A1 | 6/2014 | Kinnebrew et al. | |
| 2014/0292637 A1* | 10/2014 | Peng | G02B 27/0172 345/156 |

FOREIGN PATENT DOCUMENTS

| | | |
|---|---|---|
| JP | 2006295506 A | 10/2006 |
| WO | 2014199160 A1 | 12/2014 |

OTHER PUBLICATIONS

Office Action issued in Chinese Appln. No. 201610373472.0 dated Sep. 5, 2017. English translation provided.

Examination Report issued in GB Appln. No. 1609331.2 dated Aug. 21, 2018.

Office Action issued in Chinese Appln. No. 201610373472.0 dated Apr. 20, 2018. English Translation provided.

* cited by examiner

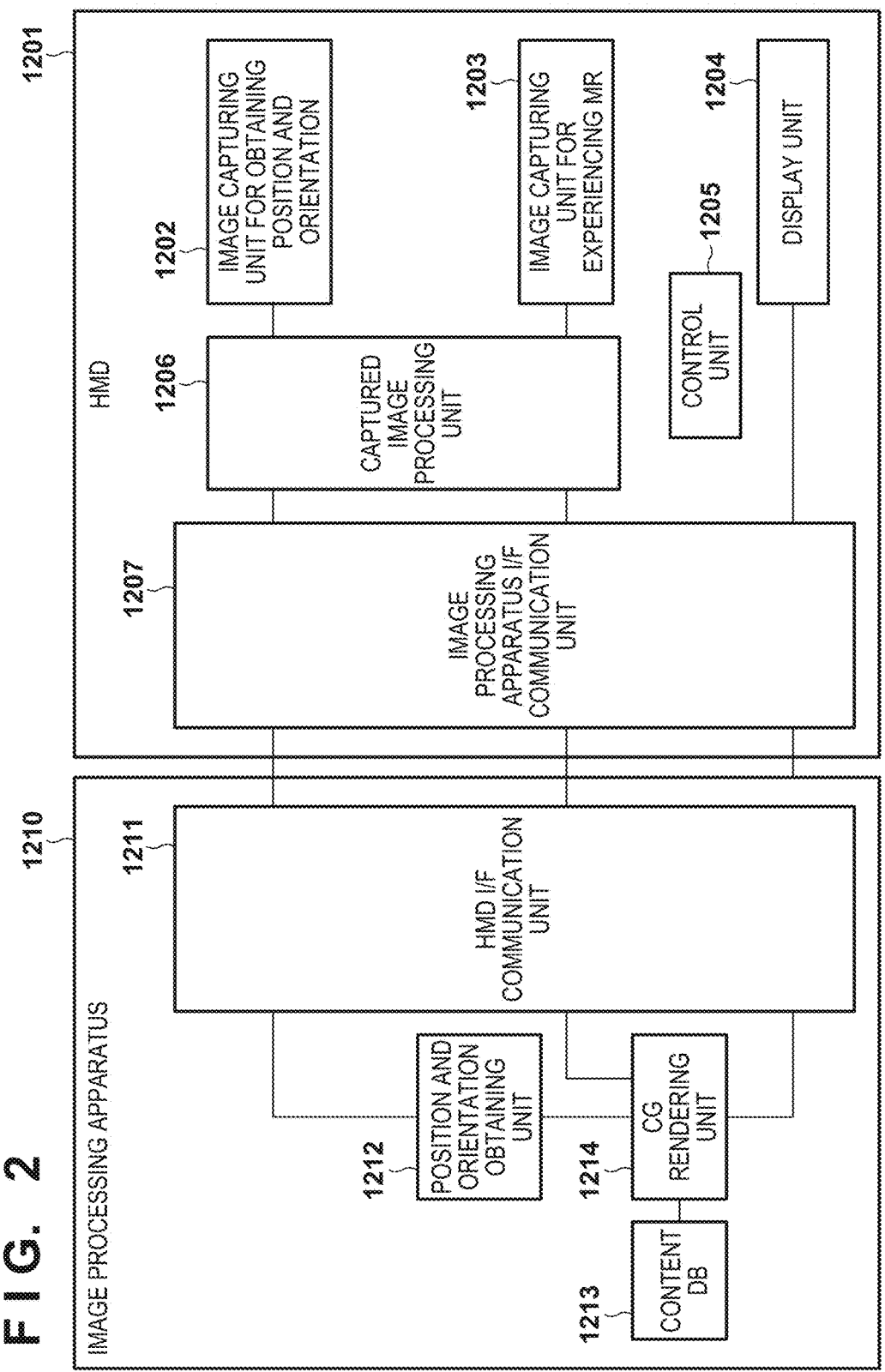

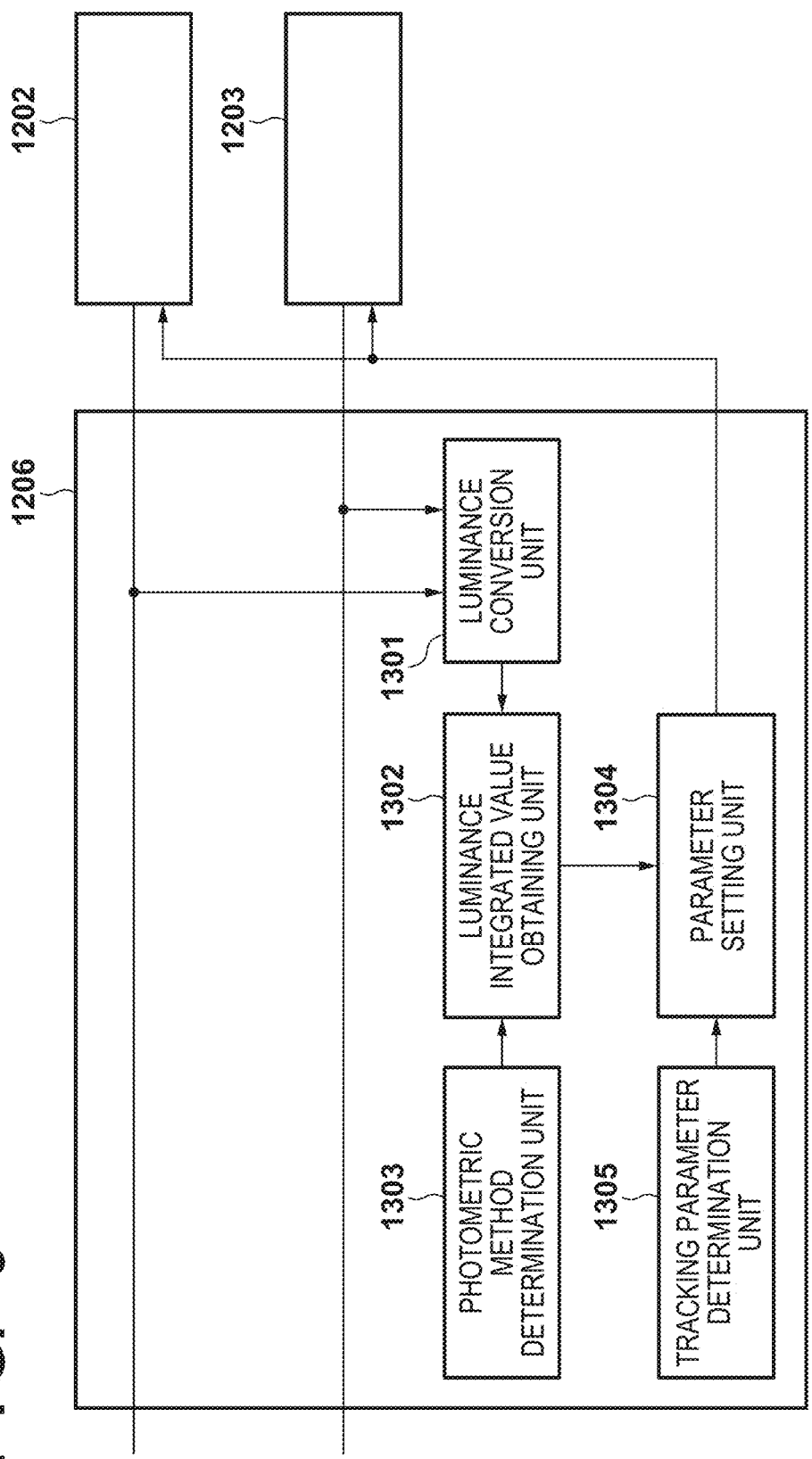

FIG. 5A

| | FOR CALCULATING POSITION AND ORIENTATION |
|---|---|
| 1 | REACH TARGET LUMINANCE WITHIN 1 fps |
| 2 | REACH TARGET LUMINANCE WITHIN 2 fps |
| 3 | REACH TARGET LUMINANCE WITHIN 3 fps |
| 4 | REACH TARGET LUMINANCE WITHIN 4 fps |
| 5 | REACH TARGET LUMINANCE WITHIN 5 fps |

FIG. 5B

| | FOR EXPERIENCING MR |
|---|---|
| 1 | REACH TARGET LUMINANCE IN 1 SECOND |
| 2 | REACH TARGET LUMINANCE IN 2 SECONDS |
| 3 | REACH TARGET LUMINANCE IN 3 SECONDS |
| 4 | REACH TARGET LUMINANCE IN 4 SECONDS |
| 5 | REACH TARGET LUMINANCE IN 5 SECONDS |

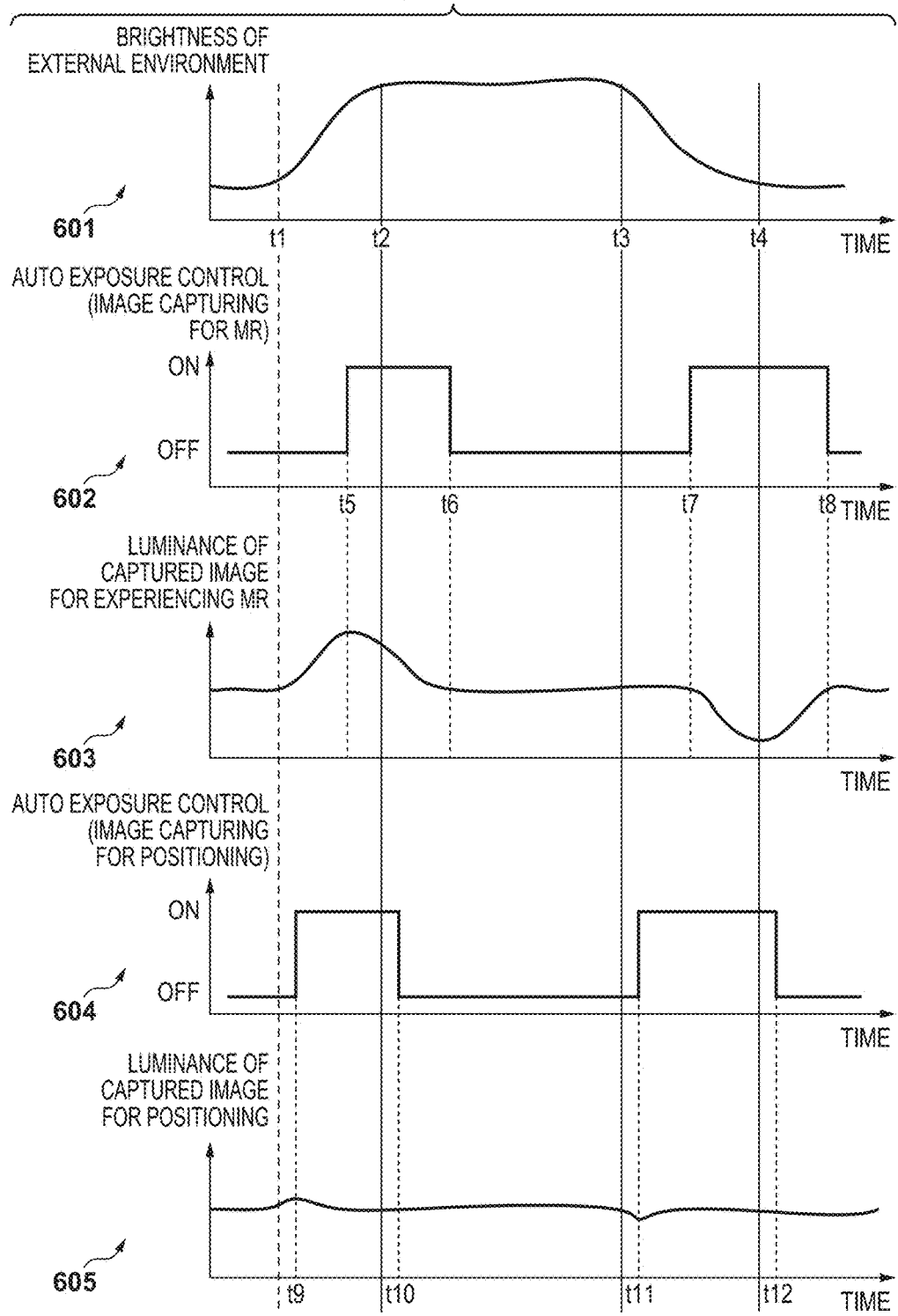

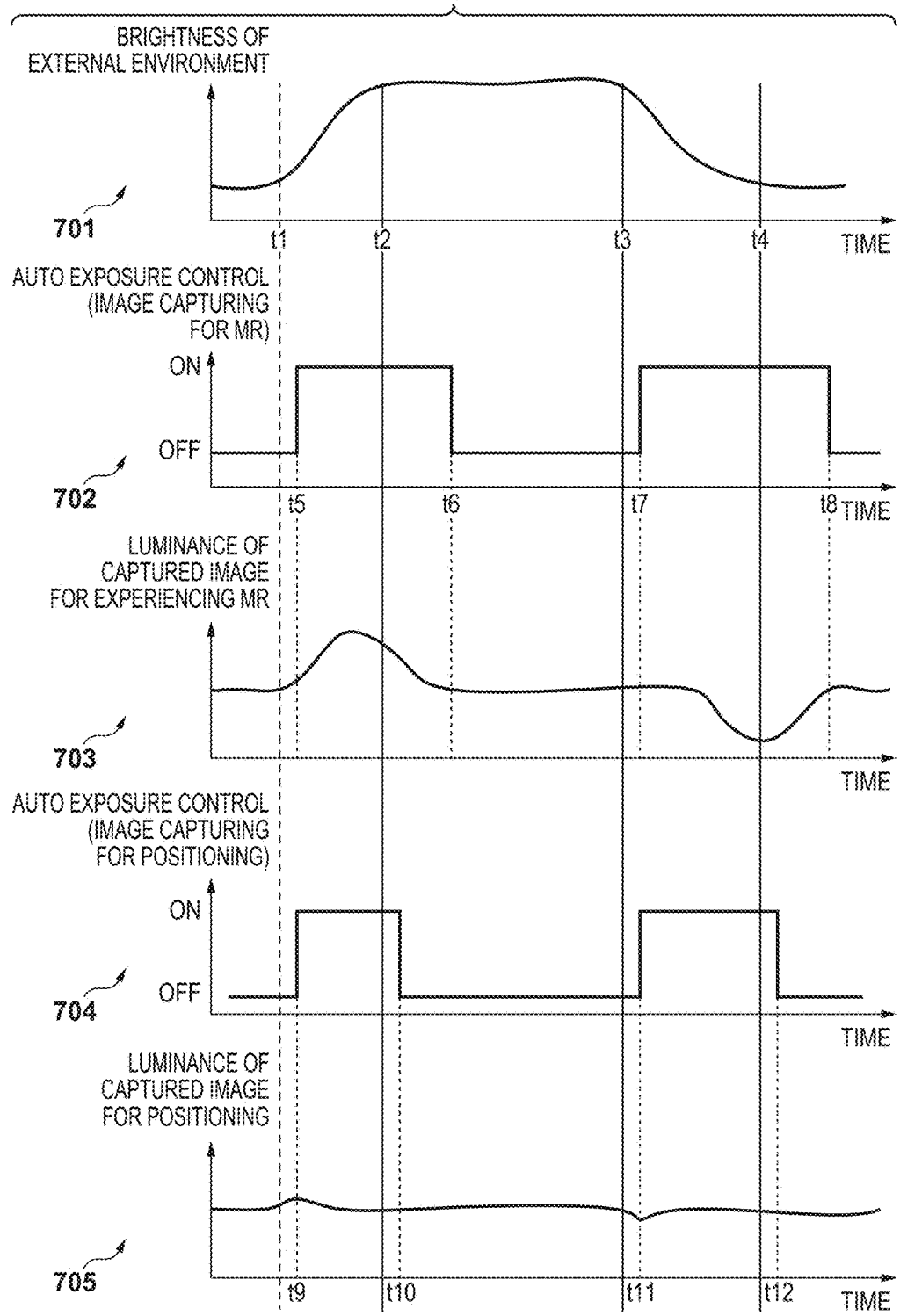

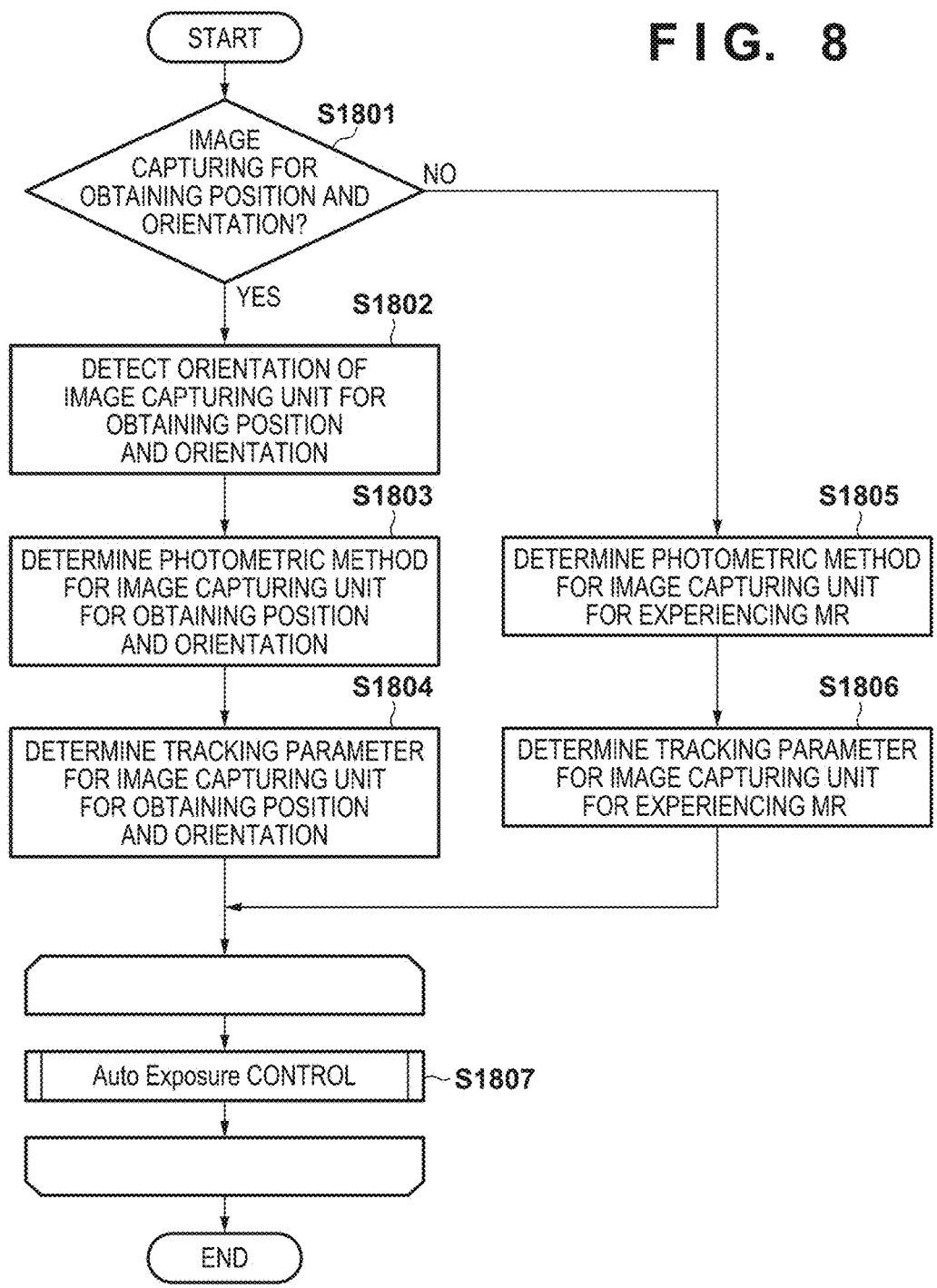

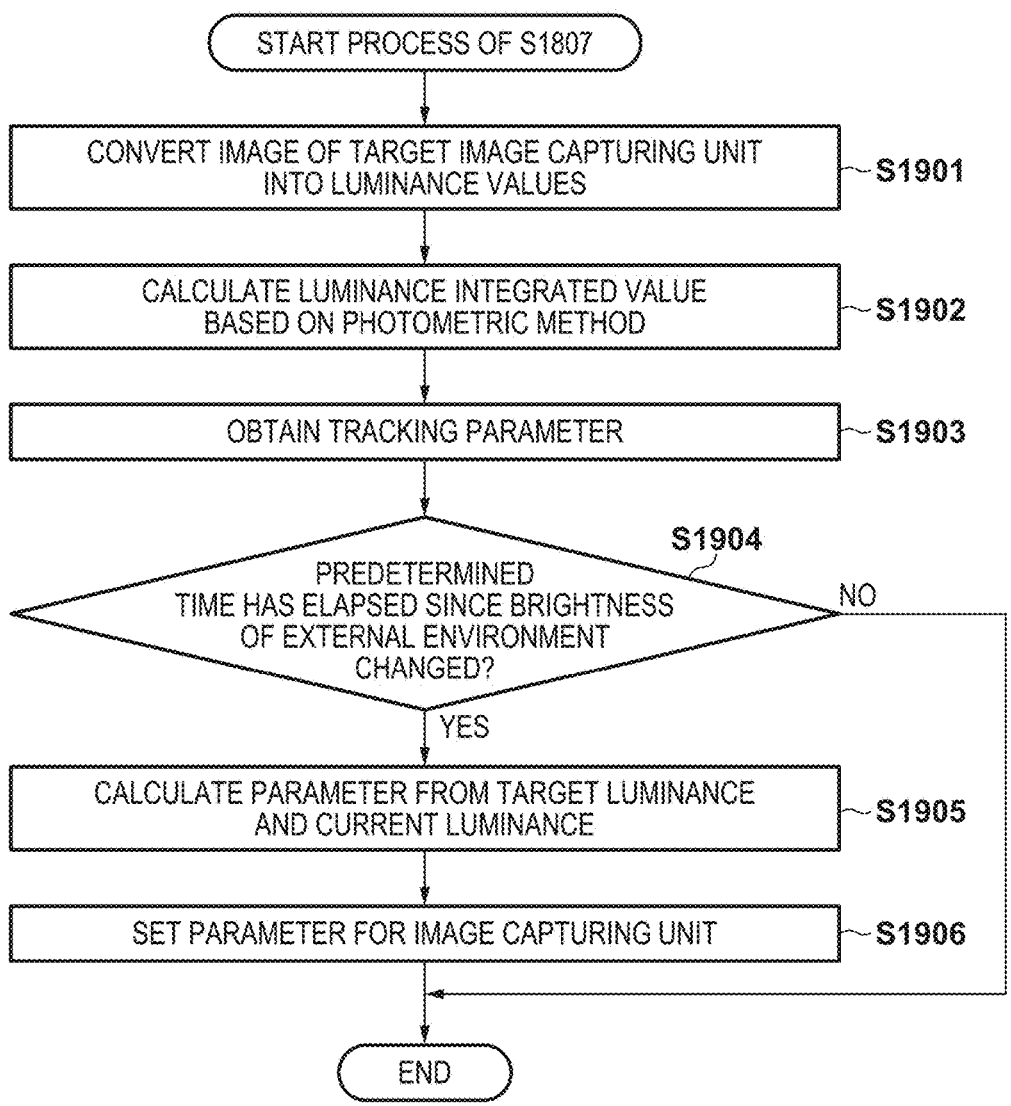

F I G. 10A
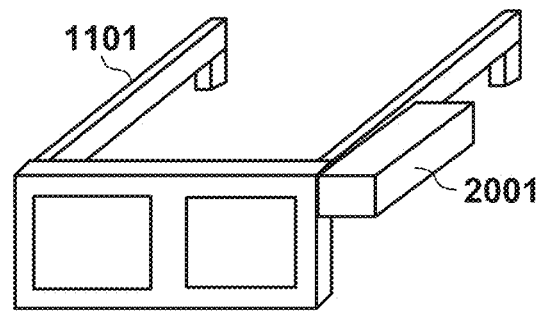
F I G. 10B
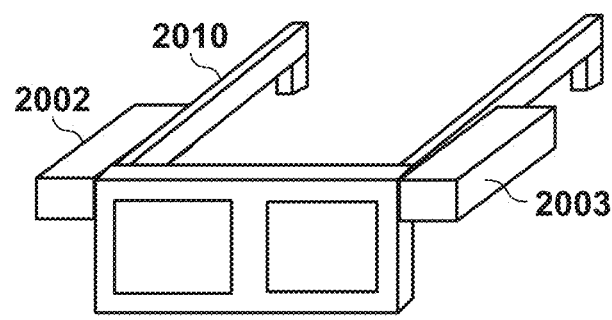
F I G. 10C
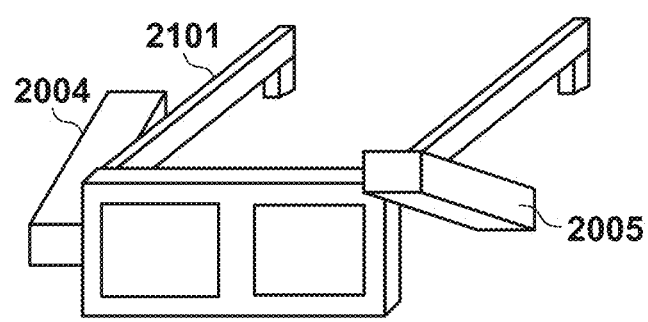

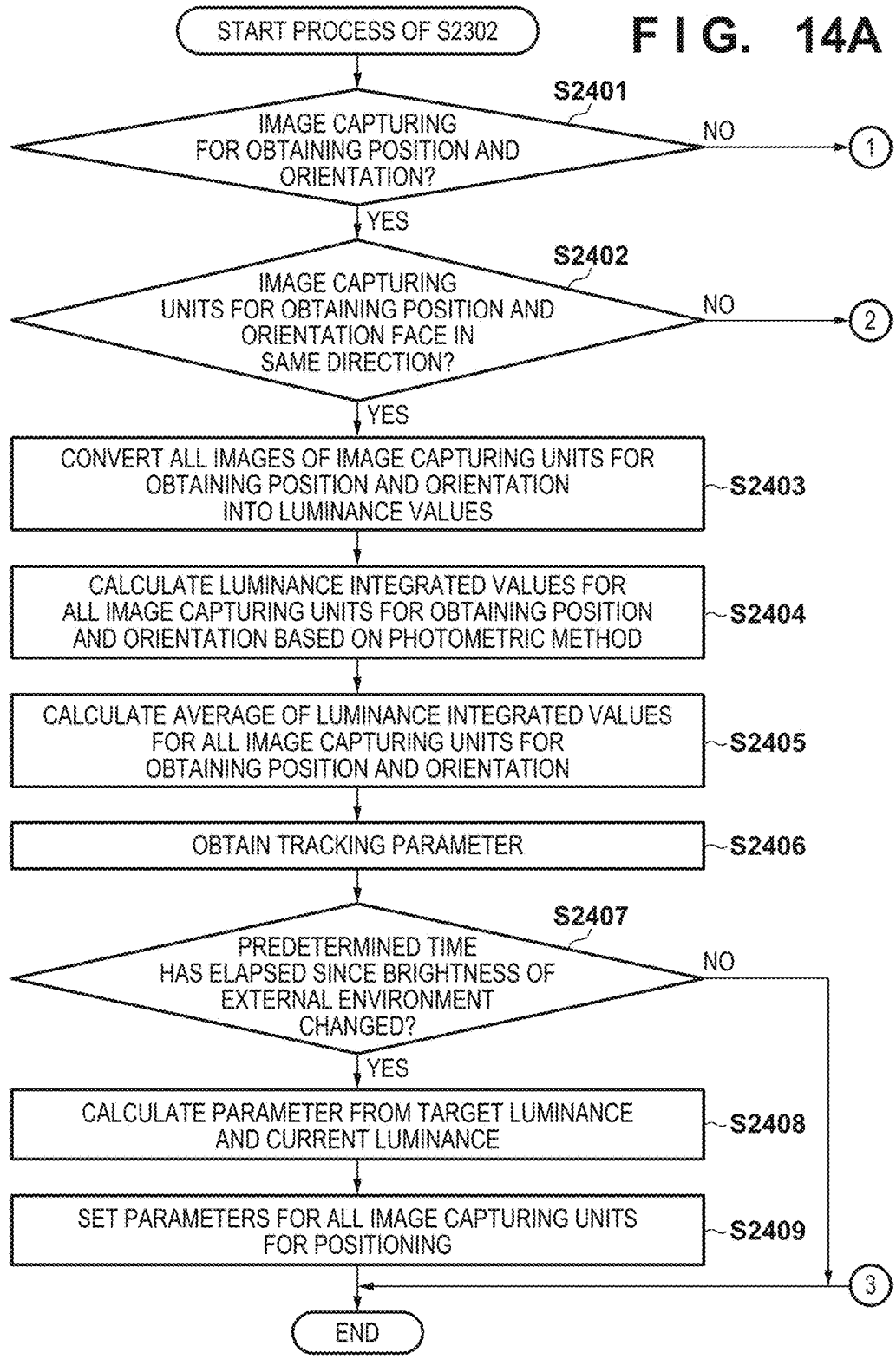

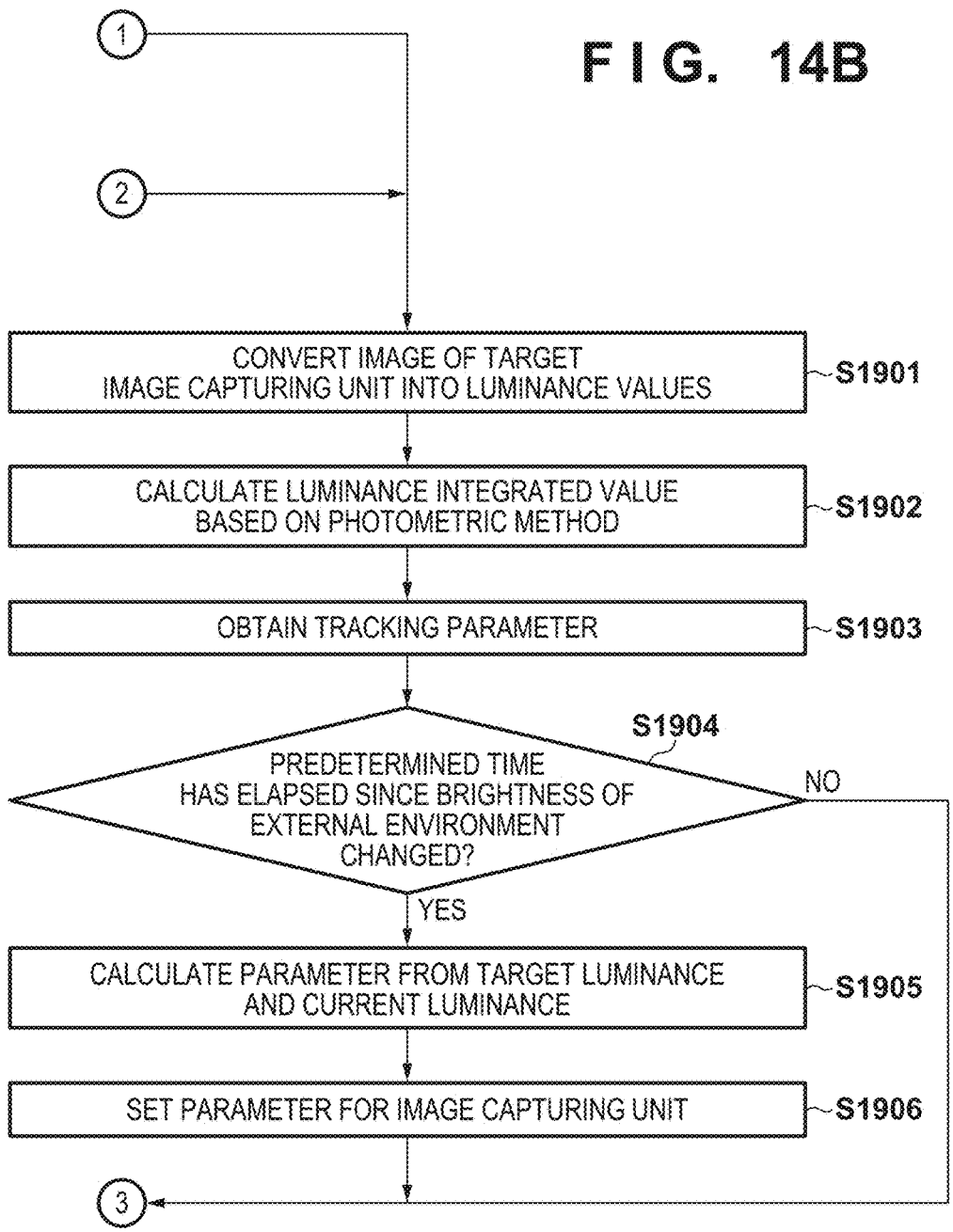

INFORMATION PROCESSING APPARATUS, METHOD FOR CONTROLLING INFORMATION PROCESSING APPARATUS, IMAGE PROCESSING SYSTEM AND NON-TRANSITORY COMPUTER-READABLE STORAGE MEDIUM

BACKGROUND OF THE INVENTION

Field of the Invention

The present invention relates to an information processing apparatus, a method for controlling the information processing apparatus and an image processing system and a non-transitory computer-readable storage medium, and in particular relates to an image processing technique using a head-mounted type display apparatus, that is, an HMD (Head Mounted Display).

Description of the Related Art

In recent years, so-called mixed reality (MR) techniques are known as a technique for seamlessly merging the real world with a virtual world in real time. One known MR technique involves using a video see-through HMD (Head Mounted Display) for capturing, using a video camera or the like, a subject that substantially matches a subject observed from the pupil position of an HMD user, and the HMD user observing a display image that is obtained by superimposing CG (Computer Graphics) onto the captured image.

The video see-through HMD has a configuration for capturing a subject using a charge coupled element such as a CCD, acquiring the digital image data of the subject, and displaying, to a wearer thereof via a display device such as a liquid crystal display or an organic EL display, an MR image (mixed reality image) obtained by superimposing a CG image on the digital image.

FIG. 15 is a diagram of an HMD 2501 when worn by an HMD user. There is an external apparatus (not illustrated) other than the HMD 2501, and a captured image that was captured by the HMD 2501 is transmitted from the HMD 2501 to the external apparatus. The external apparatus calculates the position and orientation of the HMD 2501 from the captured image received from the HMD, superimposes a CG image onto the captured image based on the calculation result, and transmits the image to the HMD. The HMD 2501 displays the superimposed image received from the external apparatus. The HMD user can experience an MR space by using the HMD 2501.

There is an HMD equipped with an image sensor for obtaining the position and orientation of the HMD 2501, in addition to an image sensor for capturing the real world and superimposing a CG image in order to experience an MR space. One reason for separating the image sensor for experiencing MR and the image sensor for obtaining position and orientation is that more accurate position and orientation can be obtained by widening the angle of view of the image sensor for obtaining position and orientation and thus widening an image capturing range so as to capture a large number of feature points for obtaining the position and orientation.

Generally, image capturing units have a function called Auto Exposure. This is a function of making the brightness of an image output from the image capturing unit constant by controlling the shutter speed, gain and the like (see Japanese Patent Laid-Open No. 2006-295506).

Here, reference numeral 16001 in FIG. 16 denotes an image of a desk when captured by an image capturing unit. The position and orientation of the HMD can be obtained by calculating the features of a mark placed on the desk. Reference numeral 16002 denotes an image obtained as a result of image capture using the image capturing unit when the real world becomes brighter, and the captured object is overexposed due to the real world having become brighter. The brightness of the real world changes in accordance with the strength of sunlight entering a window, for example. Reference numeral 16003 denotes a captured image after being captured by the image capturing unit that is similar to the image 16001 due to the Auto Exposure function of the image capturing unit operating after the image 16002.

In the Auto Exposure function described in Japanese Patent Laid-Open No. 2006-295506, image capturing for experiencing MR and image capturing for obtaining position and orientation are performed without distinguishing between them. Therefore, there is a possibility that change occurs such as from the image 16001 to the image 16002 and from the image 16002 to the image 16003. That is, the captured image is overexposed when the brightness of the external environment changes (at the time of the image 16002), and thus there is a problem that the position and orientation of the HMD cannot necessarily be obtained with high accuracy.

SUMMARY OF THE INVENTION

The present invention has been made in light of the above-described problem. The present invention provides a technique, in the case where there are a plurality of image capturing units, for performing image capture with high accuracy using each image capturing unit, even if the brightness of the external environment changes.

According to one aspect of the present invention, there is provided an information processing apparatus comprising: a luminance value obtaining unit configured to obtain a first luminance value of a first captured image of a physical space and a second luminance value of a second captured image of the physical space, wherein the first captured image is captured by a first image capturing unit and the second captured image is captured by a second image capturing unit; a parameter obtaining unit configured to obtain a first tracking parameter of automatic exposure control corresponding to a change in brightness of the physical space for the first image capturing unit and a second tracking parameter of automatic exposure control corresponding to a change in brightness of the physical space for the second image capturing unit; and a setting unit configured to set a first image capturing parameter for the first image capturing unit based on the first luminance value and the obtained first tracking parameter and a second image capturing parameter for the second image capturing unit based on the second luminance value and the obtained second tracking parameter.

Further features of the present invention will become apparent from the following description of exemplary embodiments with reference to the attached drawings.

BRIEF DESCRIPTION OF THE DRAWINGS

FIG. 2 is a functional block diagram according to the first embodiment.

FIG. 3 is a detailed block diagram of a captured image processing unit according to the first embodiment.

FIGS. 5A and 5B are tables used for determining a tracking time according to the first embodiment.

FIG. 6 is a diagram showing examples of Auto Exposure control according to the first embodiment.

FIG. 7 is a diagram showing examples of Auto Exposure control according to the first embodiment.

FIG. 8 is a flowchart of overall Auto Exposure control according to the first embodiment.

FIG. 9 is a flowchart of Auto Exposure control according to the first embodiment.

FIGS. 10A to 10C are diagrams showing an orientation of an image capturing unit for obtaining position and orientation according to a second embodiment.

FIGS. 14A and 14B are flowcharts of Auto Exposure control according to a second embodiment.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In this embodiment, separate control of an Auto Exposure (also referred to as an automatic exposure) function of an image capturing unit for experiencing MR and an Auto Exposure function of an image capturing unit for obtaining position and orientation of a head-mounted display apparatus (hereinafter, referred to as an HMD) as an information processing apparatus as well as an example in which control is performed such that the Auto Exposure function of the image capturing unit for obtaining position and orientation responds quickly to a change in the brightness of the external environment will be described.

Figure 1:
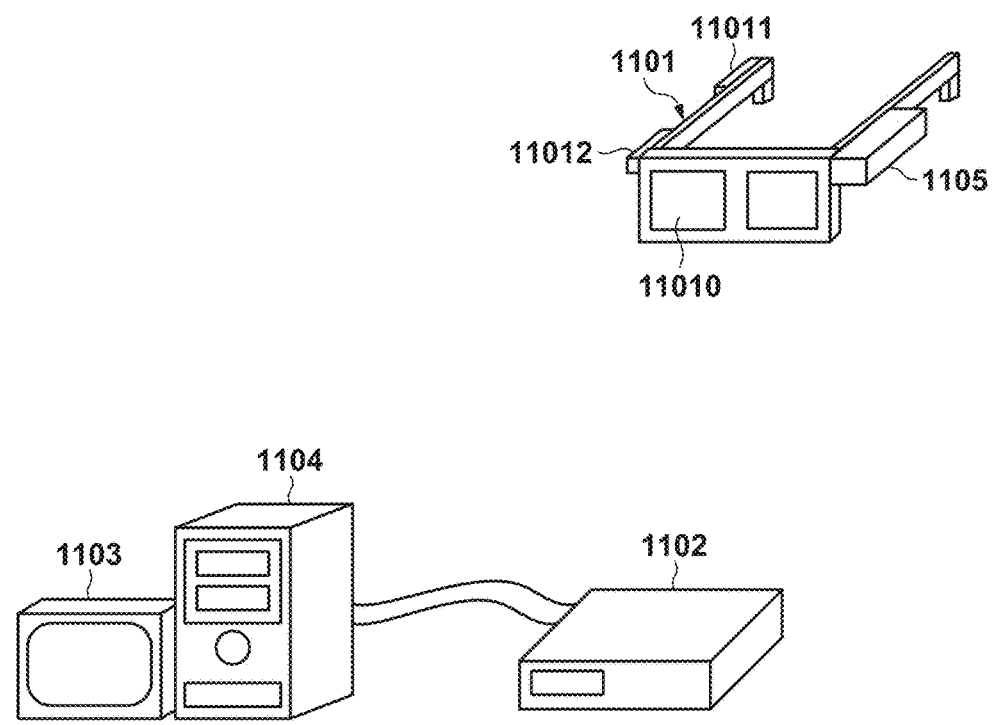
FIG. 1 is a diagram showing a configuration example of an image processing system of a first embodiment.

FIG. 1 is a diagram showing the configuration example of an image processing system according to this embodiment. In FIG. 1, the image processing system is provided with an HMD 1101, a controller 1102, and an image processing apparatus 1104 having a display unit 1103.

The HMD 1101 is provided with an image display unit 11010, a communication unit 11011 that performs communication with the controller 1102, and a control unit 11012 that controls those units, and the HMD 1101 is worn by a user on his or her head. The image display unit 11010 displays images generated by the image processing apparatus 1104. The image display unit 11010 is attached with a configuration that includes an optical system in front of each of the eyes of the user.

The HMD 1101 performs communication with the controller 1102 constituting a small scale network such as a WLAN (Wireless Local Area Network) or a WPAN (Wireless Personal Area Network). Communication is not limited to a wireless communication system, and a wired communication system may be used between the HMD 1101 and the controller 1102. Moreover, the HMD 1101 is equipped with an image capturing unit 1105. The image capturing unit 1105 captures the external environment in order to obtain the position and orientation of the HMD 1101.

The image processing apparatus 1104 that is wire-connected to the controller 1102 has a reproduction unit for reproducing images and a storage unit for storing images to be reproduced. The image processing apparatus 1104 performs communication with the HMD 1101 via the controller 1102. Also, the image processing apparatus 1104 is provided with a keyboard or the like for inputting data, instructions and the like, and input data, the results of instructions and the like are displayed on the display unit 1103.

Note that in the example in FIG. 1, the image processing apparatus 1104 and the controller 1102 have separate hardware configurations. However, it is also possible to implement all the functions of the controller 1102 in the image processing apparatus 1104 and integrate these hardware configurations, or to collect the functions of the image processing apparatus 1104 and the functions of the controller 1102 and constitute a dedicated image processing apparatus.

FIG. 2 is a functional block diagram of an image processing system that has an HMD and an image processing apparatus according to this embodiment. An HMD 1201 is provided with an image capturing unit 1202 (a first image capturing unit) for obtaining position and orientation, an image capturing unit 1203 (a second image capturing unit) for experiencing MR, a display unit 1204, a control unit 1205, a captured image processing unit 1206, an image processing apparatus I/F communication unit 1207, and other functional units (not illustrated). The HMD 1201 corresponds to the HMD 1101.

The image capturing unit 1202 for obtaining position and orientation is used for capturing the external environment and obtaining the position and orientation of the HMD. The image capturing unit 1203 for experiencing MR is used for capturing the external environment and in order to experience mixed reality. The display unit 1204 displays images. The control unit 1205 controls the HMD 1201. The captured image processing unit 1206 performs image processing on images captured by the image capturing unit 1203 for experiencing MR and the image capturing unit 1202 for obtaining position and orientation. The image processing apparatus I/F communication unit 1207 transmits/receives images and control signals.

On the other hand, an image processing apparatus 1210 is constituted by an external apparatus different from the HMD 1201 such as a PC (Personal Computer) or a WS (Workstation). The image processing apparatus 1210 is provided with an HMD I/F communication unit 1211, a position and orientation obtaining unit 1212, a content database (DB) 1213, a CG rendering unit 1214, and other functional units (not illustrated). The image processing apparatus 1210 corresponds to the image processing apparatus 1104.

The HMD I/F communication unit 1211 transmits/receives images, control signals and the like. The position and orientation obtaining unit 1212 obtains the position and orientation of the HMD 1201 from a captured image for obtaining position and orientation that was received from the HMD 1201. The content database (DB) 1213 stores CG contents of virtual images. The CG rendering unit 1214 superimposes a CG image stored in the content DB 1213 on a captured image that was captured by the image capturing unit 1203 for experiencing MR.

Note that in this embodiment, a captured image is sent from the HMD 1201 to the image processing apparatus 1210, and the image processing apparatus 1210 obtains a position and orientation and superimposes CG of a virtual image onto the captured image, but the configuration is not limited to this example. For example, a configuration may be adopted in which the position and orientation obtaining unit 1212 is mounted to the HMD 1201, and the position and orientation information of the HMD 1201 is transmitted to the image processing apparatus 1210. In this configuration, only a CG image of a virtual image is then sent from the image processing apparatus 1210 to the HMD 1201, and the captured image and the CG image are superimposed in the HMD 1201.

With the above-described configuration, images of the external environment captured by the image capturing unit 1203 for experiencing MR and the image capturing unit 1202 for obtaining position and orientation of the HMD 1201 are processed by the captured image processing unit 1206. Processing contents of the captured image processing unit 1206 include color tone correction of the captured images, processing for Auto Exposure and the like. The processed captured images are then sent to the image processing apparatus 1210 via the image processing apparatus I/F communication unit 1207.

The position and orientation obtaining unit 1212 of the image processing apparatus 1210 obtains the position and orientation of the HMD 1201 based on the received captured image for obtaining position and orientation. The CG rendering unit 1214 draws CG based on the position and orientation of the HMD 1201 obtained by the position and orientation obtaining unit 1212, and superimposes the CG on the captured image that was captured by the image capturing unit 1203 for experiencing MR. The superimposed image is then transmitted to the HMD 1201 via the HMD I/F communication unit 1211. The HMD 1201 displays, on the display unit 1204, the image received from the image processing apparatus 1210. The above configuration makes it possible for a user to observe the superimposed image obtained by superimposing the CG drawn by the image processing apparatus 1210 on the captured image, by wearing the HMD 1201.

Next, FIG. 3 is a detailed block diagram of the captured image processing unit 1206 of the HMD 1201, and in particular, it is a functional block diagram for realizing the Auto Exposure function. The captured image processing unit 1206 is provided with a luminance conversion unit 1301, a luminance integrated value obtaining unit 1302, a photometric method determination unit 1303, a parameter setting unit 1304 (a setting unit) and a tracking parameter determination unit 1305.

A captured image of a physical space that was captured by the image capturing unit 1203 for experiencing MR or the image capturing unit 1202 for obtaining position and orientation is sent to the luminance conversion unit 1301. The luminance conversion unit 1301 converts the captured image from Red (R), Green (G) and Blue (B) into a luminance value (obtains a luminance value) for each pixel. The conversion from R, G and B into a luminance (Y) is performed using the following general expression or the like.

$$Y = 0.299 \times R + 0.587 \times G + 0.114 \times B \quad (1)$$

Data converted into luminance values by the luminance conversion unit 1301 is sent to the luminance integrated value obtaining unit 1302. The luminance integrated value obtaining unit 1302 obtains a luminance integrated value that is weighted for each area, based on the luminance values sent from the luminance conversion unit 1301 and the photometric method sent from the photometric method determination unit 1303, and sends the luminance integrated value to the parameter setting unit 1304.

Figure 4A:
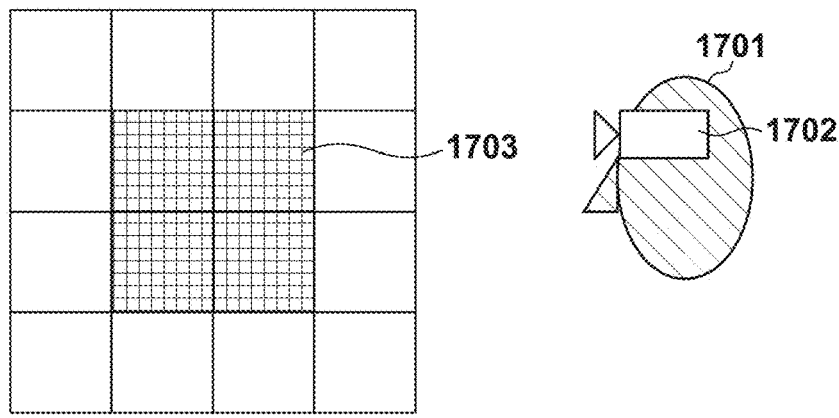
FIGS. 4A to 4C are diagrams showing a relationship between an orientation of an image capturing unit for obtaining position and orientation and a photometric method according to the first embodiment.
Figure 4B:
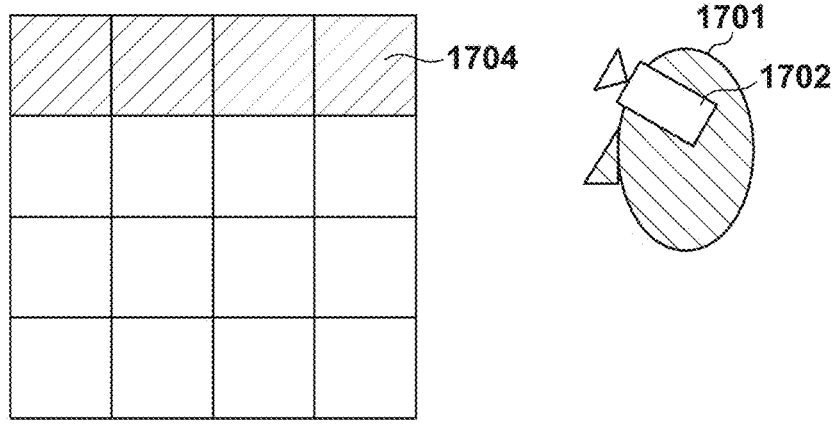
Figure 4C:
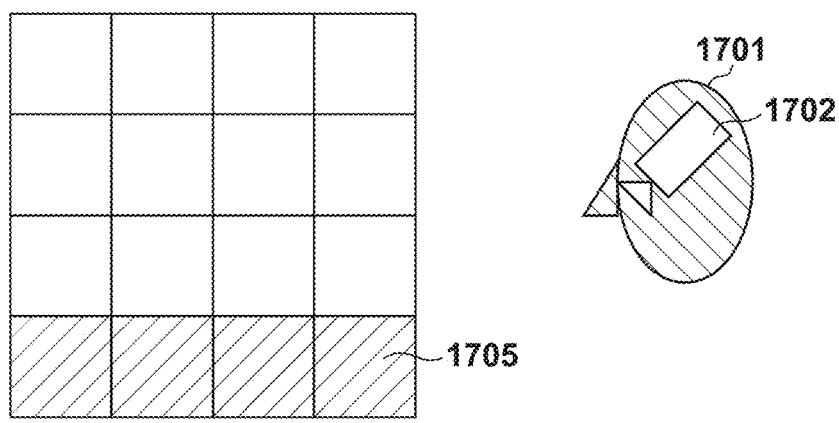

Here, the photometric method determined by the photometric method determination unit 1303 will be described. When determining the photometric method, the captured image is divided into 3×3 areas, 5×5 areas or the like, and the luminance values of which area are to be mainly used is determined. FIGS. 4A to 4C each show an example of a photometric method when dividing the captured image into 4×4 areas.

Reference numeral 1701 in FIG. 4A denotes a person who is to experience MR, and reference numeral 1702 denotes an image capturing unit for obtaining position and orientation. The image capturing unit 1702 for obtaining position and orientation in FIG. 4A is installed so as to face in substantially the same direction as the visual-line of the MR experiencing person 1701. In this case, the weights of the luminance integrated values of areas 1703 about the center of the captured image are increased.

On the other hand, the image capturing unit 1702 for obtaining position and orientation in FIG. 4B faces in a slightly upward direction. In this case, lighting attached to the ceiling may need to be removed, and thus compared with the case of FIG. 4A, the location to be weighted is changed to areas 1704. Similarly, in the case of FIG. 4C, the image capturing unit for obtaining position and orientation faces in a slightly downward direction. In this case, a shadow reflected on the floor may need to be eliminated, and thus the location to be weighted is similarly changed to areas 1705.

The orientation of the image capturing unit 1702 for obtaining position and orientation is changed in order to face in an optimum direction depending on the location for experiencing MR. For example, in the case where there is a large amount of information for obtaining the position and orientation on the floor, the image capturing unit 1702 for obtaining position and orientation is used in a manner as shown in FIG. 4C.

The tracking parameter determination unit 1305 determines, as a tracking parameter, a degree of time difference between the time when the brightness of the external environment changes and the time when the Auto Exposure control is performed, and sends this information to the parameter setting unit 1304.

Here, the tracking parameter determined by the tracking parameter determination unit 1305 will be described. A tracking parameter indicates a time difference between the time when the brightness of the external environment changes and the time when automatic exposure control tracks the change. FIGS. 5A and 5B show examples showing the extent of the time difference at which tracking of the Auto Exposure control is performed with respect to a change in the brightness of the external environment. FIG. 5A shows examples of the tracking parameter of image capturing for obtaining position and orientation, and FIG. 5B shows examples of the tracking parameter of image capturing for experiencing MR.

In the examples in FIGS. 5A and 5B, control is performed such that an output image from the image capturing unit 1202 for obtaining position and orientation reaches a target luminance within 1 fps, or reaches the target luminance within 5 fps, for example. On the other hand, FIG. 5B shows examples of the tracking parameter of the image capturing unit 1203 for experiencing MR, and control is performed so as to reach the target luminance in one second, or to reach the target luminance in five seconds. Thus, the tracking parameter for obtaining position and orientation is a parameter for reaching the target luminance earlier than the tracking parameter for experiencing MR.

Based on the luminance integrated value for each area received from the luminance integrated value obtaining unit 1302 and the tracking parameter received from the tracking parameter determination unit 1305, the parameter setting unit 1304 derives image capturing parameters such as shutter speed and gain, which are to be set for the image capturing unit 1203 for experiencing MR and the image capturing unit 1202 for obtaining position and orientation such that the brightness of the captured image is constant, and sends the image capturing parameters to the image capturing unit 1203 for experiencing MR and the image capturing unit 1202 for obtaining position and orientation.

Note that in this embodiment, a method for controlling at least one of the shutter speed and the gain in order to change the luminance of the captured image will be described, but the present invention is not limited thereto.

Next, a method for changing the shutter speed that is performed by the parameter setting unit 1304 will be described. Reference numerals 601 to 605 in FIG. 6 denote diagrams showing the change in the brightness of the external environment, various control timings based on the change, and the luminance of a captured image that is output by such control. The diagram 601 is a diagram showing the change in the brightness of the external environment. The vertical axis indicates brightness and the horizontal axis indicates time, and brightness is shown to increase from a time t1 to a time t2 and to decrease from a time t3 to a time t4.

The diagram 602 shows on/off control of Auto Exposure control of the image capturing unit 1203 for experiencing MR in the case where the brightness of the external environment changes as shown in the diagram 601. Auto Exposure control is started at a time t5 when a certain amount of time has elapsed from the time t1, and the control is ended at a time t6 when a certain amount of time has elapsed from the time t2. Similarly, Auto Exposure control is started at a time t7 when a certain amount of time has elapsed from the time t3, and the control is ended at a time t8 when a certain amount of time has elapsed from the time t4.

The diagram 603 shows luminance information of a captured image output from the image capturing unit 1203 for experiencing MR in the case where on/off control shown in the diagram 602 is performed. The control tracks changes in the brightness of the external environment with a small delay, and keeps the luminance of the captured image generally constant. Responding quickly to changes in the brightness of the external environment feels unnatural to the MR experiencing person, and therefore the control tracks changes in the brightness of the external environment with a small delay.

The diagram 604 shows on/off control of Auto Exposure control of the image capturing unit 1202 for obtaining position and orientation. The control starts at a time t9, which is an earlier timing than the start time t5 of the on/off control of the image capturing unit 1203 for experiencing MR, and the control ends at a time t10, which means that the control ends at an earlier timing than a time t6 when the on/off control of the image capturing unit 1203 for experiencing MR ends.

The diagram 605 shows the luminance information of a captured image output from the image capturing unit for obtaining position and orientation when on/off control shown in the diagram 604 is performed. As shown in the diagram 605, the control tracks the change in the brightness of the external environment without a delay so as to keep the brightness constant.

Note that instead of the control shown in the diagrams 601 to 605, control as shown in diagrams 701 to 705 in FIG. 7 may be performed. The diagram 701 is a diagram showing change in the luminance of the external environment, and is similar to the diagram 601. Among the diagrams 601 to 605 and the diagrams 701 to 705, the diagram 602 and the diagram 702 are different. Specifically, a start time of Auto Exposure control ON of the image capturing unit 1203 for experiencing MR is different. A start time t5 in the diagram 702 is between a time t1 and a time t2, but it is earlier than the start time t5 in the diagram 602. Similarly, a start time t7 in the diagram 702 is between a time t3 and a time t4, but it is earlier than a start time t7 in the diagram 602.

Figure 16:
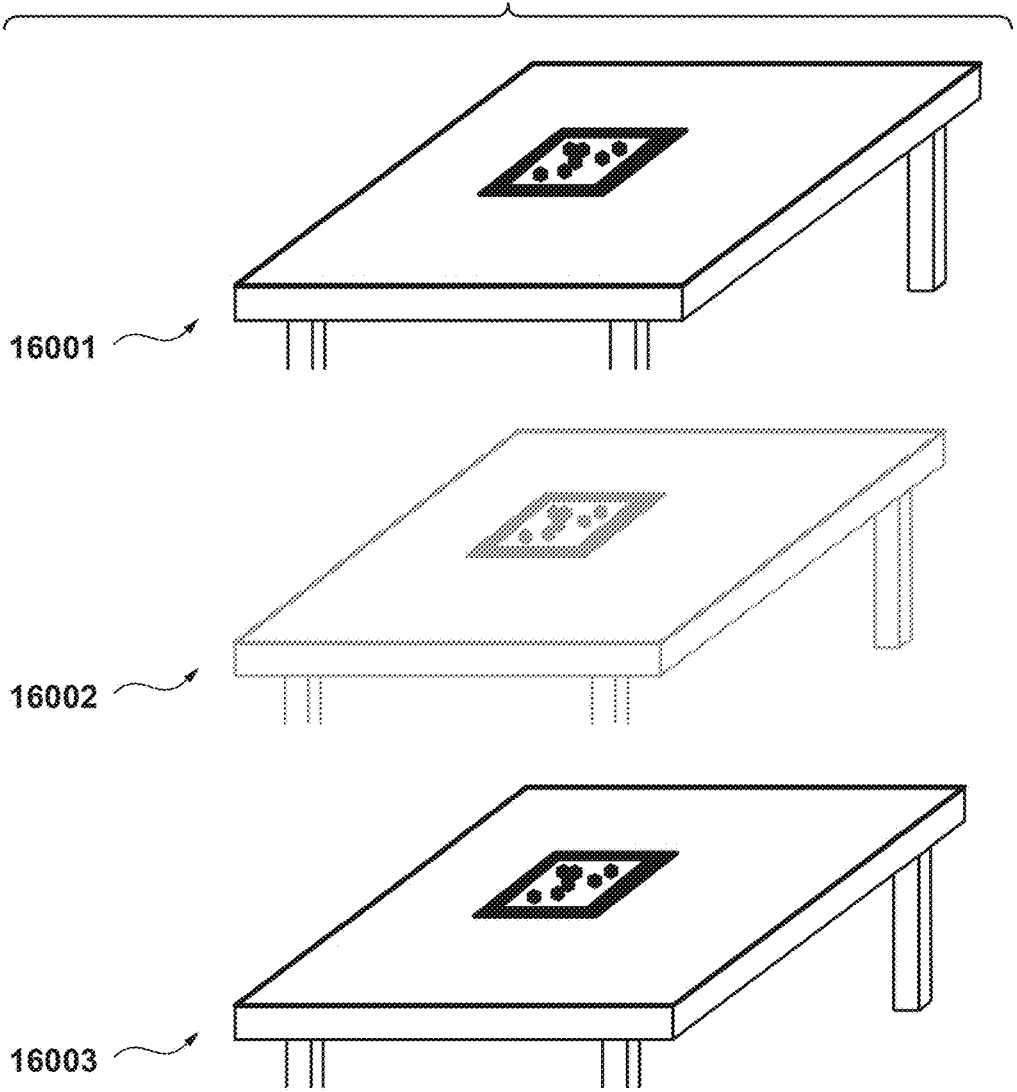
FIG. 16 is a diagram showing a state of an object when the brightness of the external environment changes.

It is sufficient that start and end of Auto Exposure control of the image capturing unit 1203 for experiencing MR is controlled such that the luminance information of the captured image output from the image capturing unit 1203 for experiencing MR tracks the change in the brightness of the external environment with a small delay, and methods other than the control methods shown in FIG. 6 and FIG. 7 may be used. Even when the brightness of the external environment changes as in the case shown in FIG. 16, by performing Auto Exposure control of the image capturing unit 1202 for obtaining position and orientation as shown in FIG. 6 and the like, output images from the image capturing unit 1202 for obtaining position and orientation change in the manner of 16001 to 16003 in FIG. 16, rather than in the manner of 16001 to 16002 in FIG. 16.

FIG. 8 is a flowchart showing a processing procedure of Auto Exposure control performed by the captured image processing unit 1206 according to this embodiment. In step S1801, the luminance conversion unit 1301 determines whether the captured image is a captured image for obtaining position and orientation or a captured image for experiencing MR. In the case of a captured image for obtaining position and orientation, the operation is advanced to step S1802. On the other hand, in the case of a captured image for experiencing MR, the operation is advanced to step S1805.

In step S1802, the photometric method determination unit 1303 detects the orientation of the image capturing unit 1202 for obtaining position and orientation. Note that regarding the orientation of the image capturing unit 1202 for obtaining position and orientation, the orientation of the image capturing unit 1202 for obtaining position and orientation may be stored in a ROM mounted to the HMD 1201 in advance. Alternatively, data may be received from the image processing apparatus 1210, or the HMD 1201 may obtain the orientation of the image capturing unit 1202 for obtaining position and orientation by the HMD 1201 capturing a specific chart.

In step S1803, the photometric method determination unit 1303 determines the photometric method based on the orientation of the image capturing unit 1202 for obtaining position and orientation. As described with reference to FIGS. 4A to 4C, the photometric method is determined based on the orientation of the image capturing unit 1202 for obtaining position and orientation. In step S1804, the tracking parameter determination unit 1305 determines a parameter for tracking the change in the brightness of the external environment. Determination of a tracking parameter may be performed by the image processing apparatus 1210, or may be determined in connection sequence between the HMD 1201 and the image processing apparatus 1210.

In step S1805, the photometric method determination unit 1303 determines a photometric method. For example, a method for mainly using a central area is determined to be the photometric method regarding a captured image for experiencing MR. In step S1806, the tracking parameter determination unit 1305 determines a parameter for tracking the change in the brightness of the external environment regarding the captured image for experiencing MR. In step S1807, the captured image processing unit 1206 performs Auto Exposure control (to be described later in detail with reference to FIG. 9), and the processes of the flowchart of FIG. 8 end.

A process of step S1807 will be described below in detail with reference to a flowchart in FIG. 9. In step S1901, the luminance conversion unit 1301 performs conversion on the obtained captured image into luminance values. Conversion from Red, Green and Blue into luminance values is performed as described above. In step S1902, the luminance integrated value obtaining unit 1302 obtains a luminance integrated value for each area based on the luminance value for each pixel sent from the luminance conversion unit 1301 and the photometric method determined by the photometric method determination unit 1303.

In step S1903, the tracking parameter determination unit 1305 obtains the tracking parameter determined in step S1804 or step S1806. In step S1904, the parameter setting unit 1304 determines whether or not a predetermined time corresponding to the tracking parameter obtained in step S1903 has elapsed since the brightness of the external environment changed. In the case where the predetermined time has elapsed, the operation is advanced to step S1905. On the other hand, in the case where the predetermined time has not elapsed, the operation ends.

In step S1905, the parameter setting unit 1304 determines an image capturing parameter (shutter speed, gain and the like) to be set for each of the image capturing units (the image capturing unit 1202 for obtaining position and orientation and the image capturing unit 1203 for experiencing MR) from the luminance integrated value for each area obtained by the luminance integrated value obtaining unit 1302. In step S1906, the parameter setting unit 1304 sets the image capturing parameter determined in step S1905 for each of the image capturing units. The processes of the flowchart in FIG. 9 then end.

As described above, in this embodiment, Auto Exposure control of the image capturing unit for experiencing MR and Auto Exposure control of the image capturing unit for obtaining position and orientation are performed after each of the image capturing units is optimized, and thus even in the case where the brightness of the external environment changes, a more accurate position and orientation can be obtained.

Second Embodiment

In the first embodiment, one image capturing unit for obtaining position and orientation is used, but in this embodiment, processing in the case where there are a plurality of image capturing units for obtaining position and orientation will be described.

FIG. 10A shows the HMD 1101 that is used in the first embodiment and is equipped with one image capturing unit 2001 for obtaining position and orientation. In contrast, FIG. 10B shows an HMD 2010 that is used in this embodiment and is equipped with two image capturing units 2002 and 2003 for obtaining position and orientation. In FIG. 10B, the image capturing units 2002 and 2003 for obtaining position and orientation are connected to an HMD so as to face in the same direction, but a configuration may be adopted in which an image capturing unit 2005 for obtaining position and orientation is connected to an HMD so as to face in an upward direction and an image capturing unit 2004 for obtaining position and orientation is connected to the HMD so as to face in a downward direction as shown in FIG. 10C.

Figure 11:
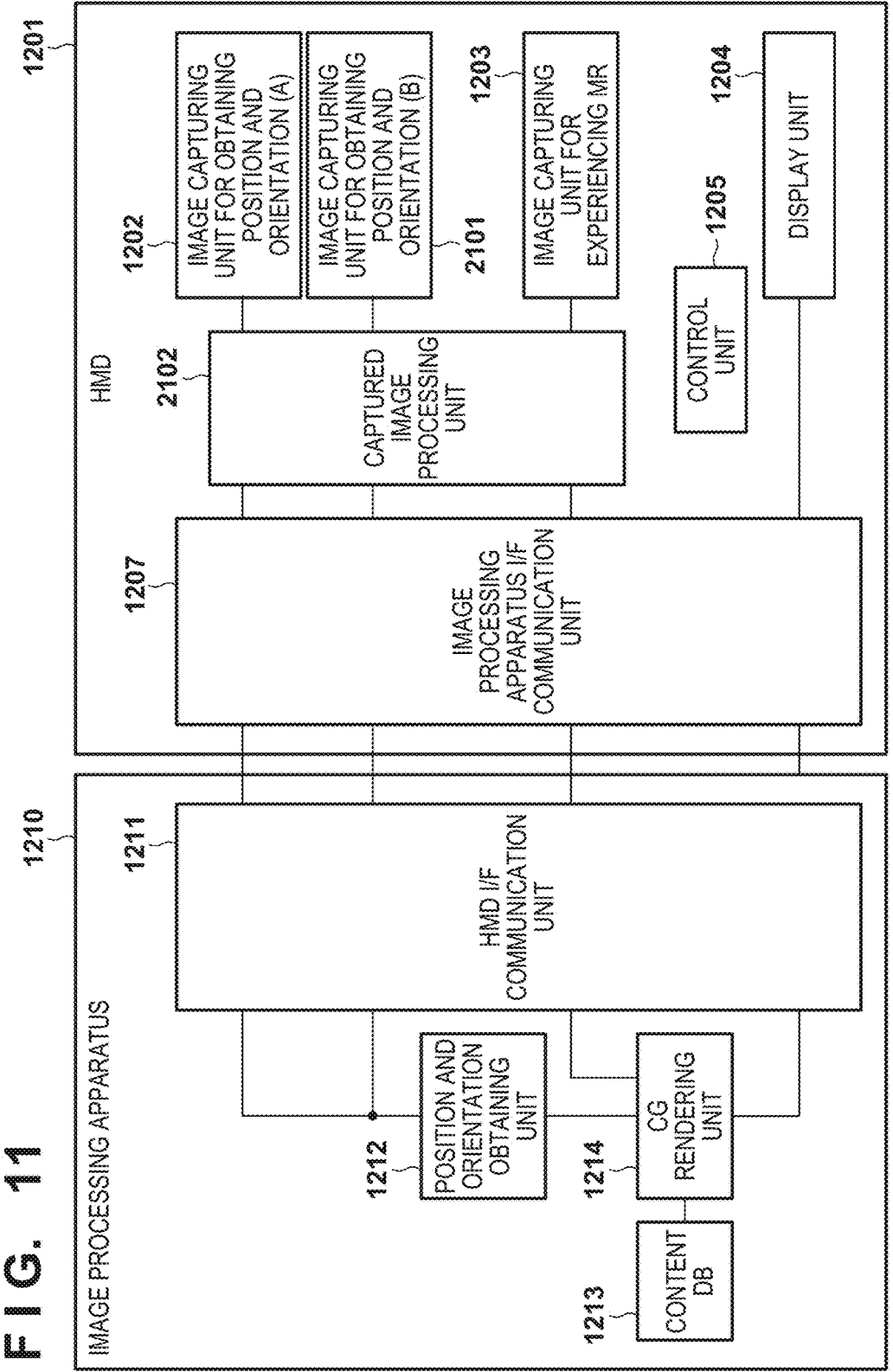
FIG. 11 is a functional block diagram according to the second embodiment.

FIG. 11 is a functional block diagram of an image processing system having an HMD and an image processing apparatus according to this embodiment. Unlike FIG. 2, an image capturing unit 2101 for obtaining position and orientation (B) is mounted, and a captured image processing unit 2102 is constituted to be able to process three cameras. In this embodiment, an example in which there are two image capturing units for obtaining position and orientation will be described, but it is sufficient that the number of image capturing units for obtaining position and orientation is two or more, and is not particularly limited to two.

Figure 12:
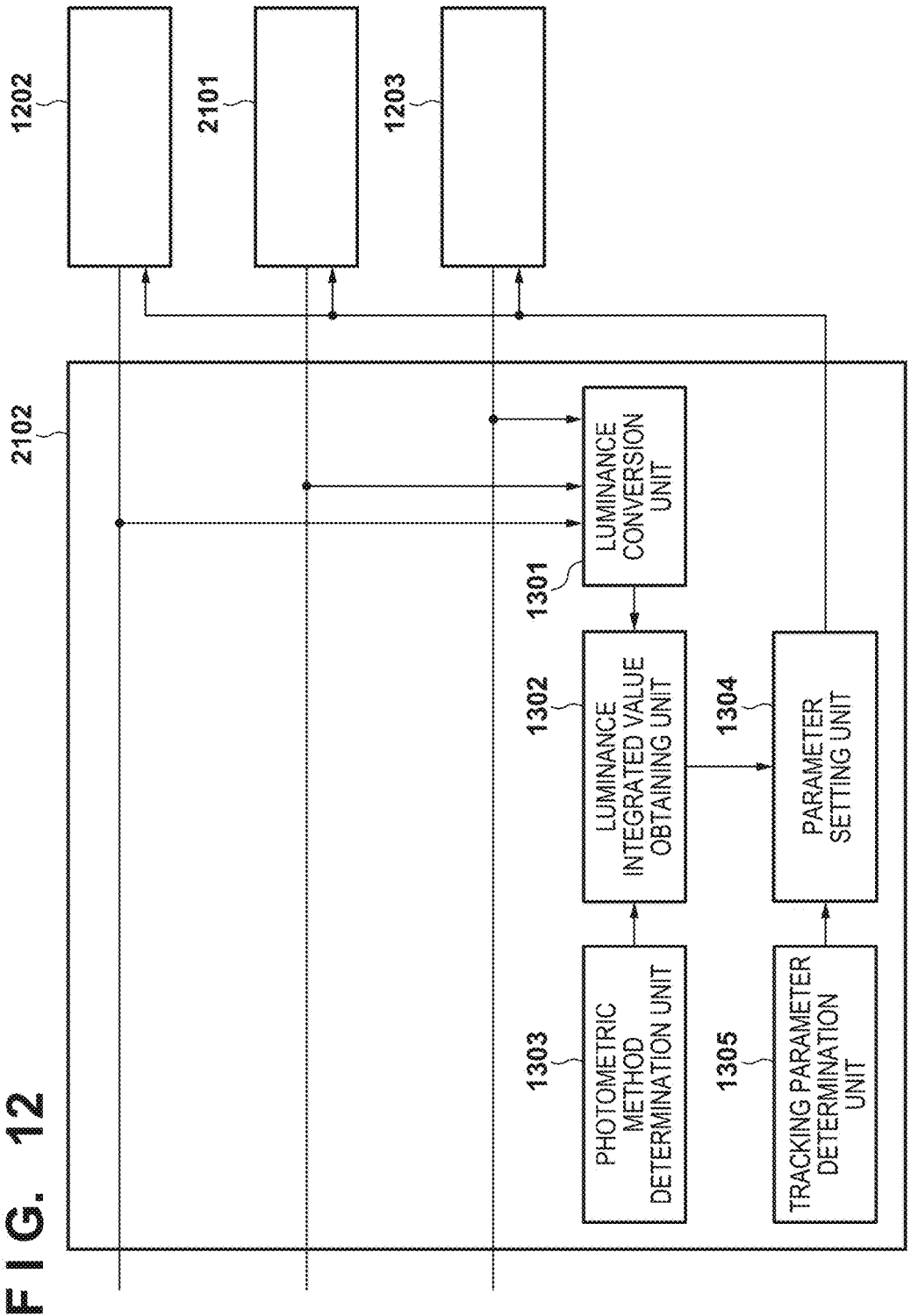
FIG. 12 is a detailed block diagram of a captured image processing unit according to the second embodiment.

FIG. 12 is a detailed block diagram of the captured image processing unit 2102 of the HMD 1201, and, in particular, is a functional block diagram for realizing the Auto Exposure function. Unlike FIG. 3, a captured image captured by the image capturing unit 2101 for obtaining position and orientation can be received by the captured image processing unit 2102. The configuration of the processing unit for processing the received captured image is similar to that in FIG. 3.

Figure 13:
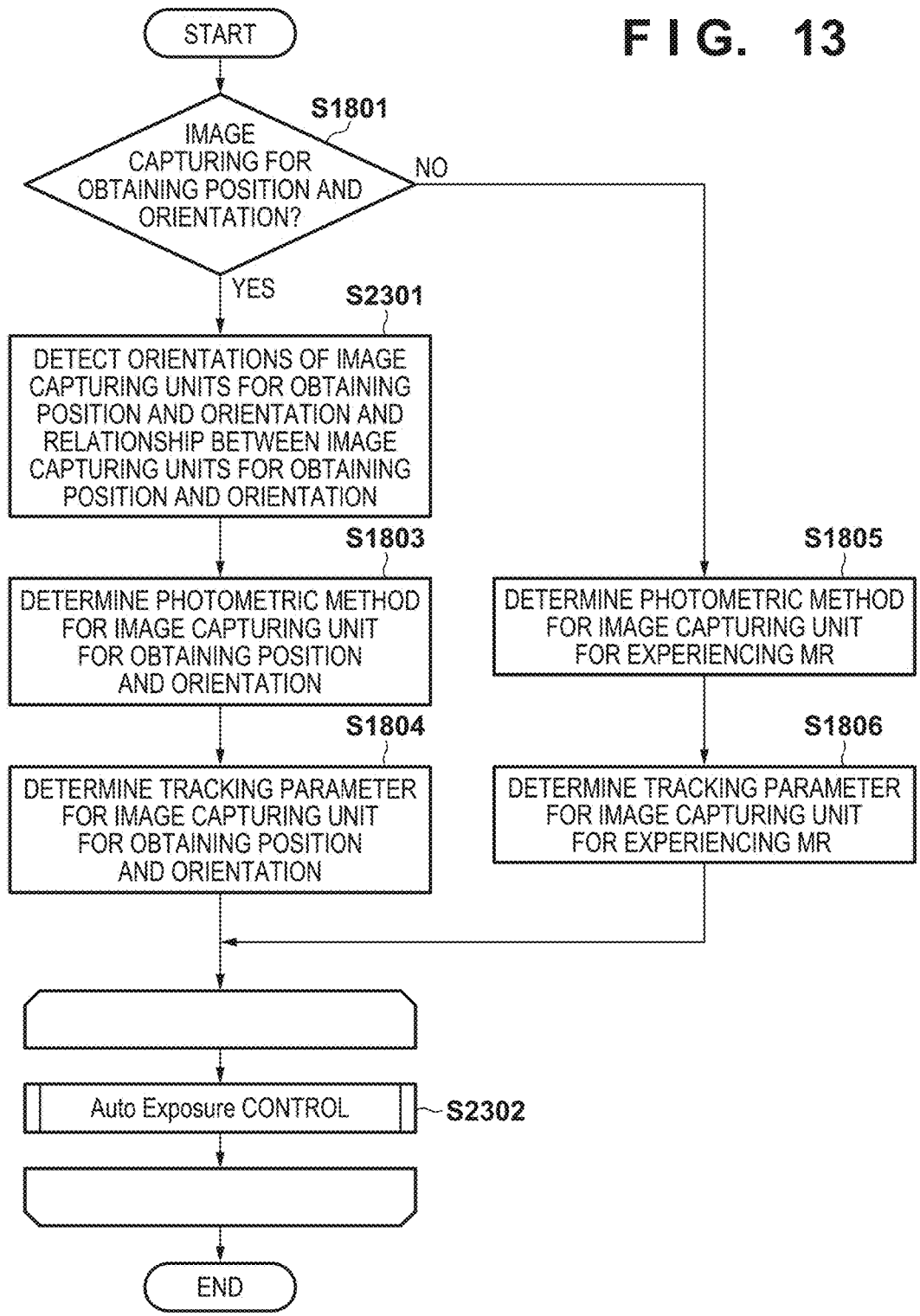
FIG. 13 is a flowchart of overall Auto Exposure control according to the second embodiment.
Figure 15:
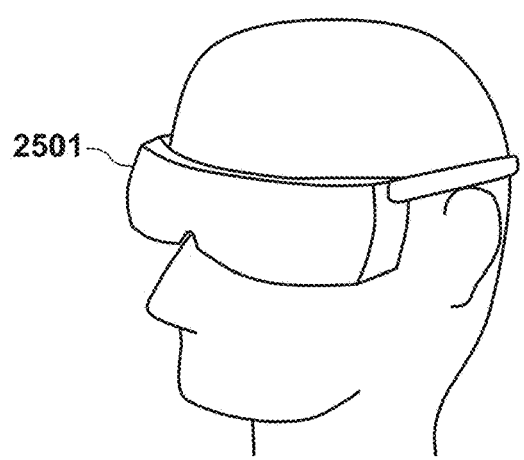
FIG. 15 is a diagram showing a state in which an HMD is worn by a user.

Next, FIG. 13 is a flowchart showing a processing procedure of Auto Exposure control performed by the captured image processing unit 2102 according to this embodiment. The description will be given below with a focus on the differences from each process of the flowchart in FIG. 8 of the first embodiment.

In step S1801, the luminance conversion unit 1301 determines whether or not a captured image is a captured image for obtaining position and orientation or a captured image for experiencing MR. In the case of a captured image for obtaining position and orientation, the operation is advanced to step S2301 instead of step S1802. However, in the case of a captured image for experiencing MR, the operation is advanced to step S1805 similarly to the first embodiment.

In step S2301, the photometric method determination unit 1303 detects the directions of the image capturing units for obtaining position and orientation and the relationship between the image capturing units for obtaining position and orientation. The directions of image capturing units are detected in order to determine a photometric method similarly to the first embodiment.

The relationship between the image capturing units will be described below. As in FIGS. 10B and 10C, the relationship of the orientations of the image capturing units for obtaining position and orientation is detected. In the case of the example of FIG. 10B, the image capturing units 2002 and 2003 for obtaining position and orientation face in the same direction, but in the case of the example in FIG. 10C, the image capturing unit 2005 for obtaining position and orientation faces upward, and the image capturing unit 2004 for obtaining position and orientation faces downward. In the case where the directions in which the image capturing units for obtaining position and orientation face are different as in FIG. 10C, it is preferred that Auto Exposure control is separately controlled instead of synchronizing Auto Exposure control. This is because change in the lighting environment captured by an image capturing unit facing upward and change in the lighting environment captured by an image capturing unit facing downward are different in most cases.

However, in the case of an installation location as shown in FIG. 10B, the image capturing unit 2002 for obtaining position and orientation and the image capturing unit 2003 for obtaining position and orientation both face in the same direction, and thus the change in the lighting environment captured by the image capturing unit 2002 for obtaining position and orientation and the change in the lighting environment captured by the image capturing unit 2003 for obtaining position and orientation are substantially the same. Therefore, it is preferred to synchronize the Auto Exposure control.

Regarding a method for detecting the relationship of the orientations in which the image capturing units are mounted, a configuration may be adopted in which the relationship between the image capturing units is stored in advance in a ROM mounted to the HMD 1201 and is then read out. Alternatively, data may be received from the image processing apparatus 1210, or the relationship may be estimated from the luminance distribution of an image captured by the HMD 1201. For example, using the fact that a luminance integrated value for each area of the screen is obtained, it may be estimated that the directions in which the image capturing units face are different in the case where the luminance integrated value for each area is different between the image capturing units by an amount greater than or equal to a threshold value. However, if the difference is less than or equal to the threshold value, it may be estimated that directions in which the image capturing units face are the same.

The other processes in FIG. 13 are similar to those in the first embodiment, but the processing contents of Auto Exposure control of step S2302 is different from that in the first embodiment.

The process of step S2302 will be described below in detail with reference to a flowchart in FIGS. 14A-14B with a focus on the difference from processes of the flowchart in FIG. 9. In step S2401, the luminance conversion unit 1301 determines whether the received captured image is a captured image for obtaining position and orientation or a captured image for experiencing MR. In the case of a captured image for obtaining position and orientation, the operation is advanced to step S2402. On the other hand, in the case of a captured image for experiencing MR, the operation is advanced to step S1901.

In step S2402, the luminance conversion unit 1301 determines whether the orientations of the image capturing units for obtaining position and orientation are the same, using the orientations of the image capturing units for obtaining position and orientation detected in step S2301. In the case where directions in which the image capturing units face are the same, the operation is advanced to step S2403. However, in the case where directions in which the image capturing units face are different, the operation is advanced to step S1901.

In step S2403, the luminance conversion unit 1301 converts all the images of the image capturing unit for obtaining position and orientation into luminance values. In step S2404, the luminance integrated value obtaining unit 1302 obtains a luminance integrated value for each area regarding each of the image capturing units for obtaining position and orientation based on the luminance values sent from the luminance conversion unit 1301 and the photometric method determined by the photometric method determination unit 1303.

In step S2405, the luminance integrated value obtaining unit 1302 obtains an average luminance integrated value based on the luminance integrated values of each of the image capturing units for obtaining position and orientation that were obtained in step S2404. In step S2406, the tracking parameter determination unit 1305 determines a parameter for tracking the change in the brightness of the external environment. In step S2407, the parameter setting unit 1304 determines whether or not a predetermined time corresponding to the tracking parameter obtained in step S2406 has elapsed since the brightness of the external environment changed. In the case where the predetermined time has elapsed, the operation is advanced to step S2408. On the other hand, in the case where the predetermined time has not elapsed, the operation ends.

In step S2408, the parameter setting unit 1304 determines image capturing parameters (shutter speed, gain and the like) that are to be set for the respective image capturing units based on the luminance integrated value for each area obtained by the luminance integrated value obtaining unit 1302. In step S2409, the parameter setting unit 1304 sets the parameters that were determined in step S2408 and are to be set for the image capturing units, and sets the parameters for the respective image capturing units.

On the other hand, in the case where it is determined in step S2401 that the captured image is not a captured image for obtaining position and orientation, or it is determined in step S2402 that the image capturing units for obtaining position and orientation face in different directions, the operation is advanced to the processes of steps S1903 to 1906. The same control as Auto Exposure control in the case where there is one image capturing unit is then performed.

In this embodiment, an example in which there are two image capturing units for obtaining position and orientation was described, but there may be three or more image capturing units for obtaining position and orientation. In that case, it is sufficient that Auto Exposure control is performed for each of the image capturing units for obtaining position and orientation that face in the same direction.

As described above, according to this embodiment, in the case where there are a plurality of image capturing units for obtaining position and orientation, even if the brightness of the external environment changes, a position and orientation can be more accurately obtained.

According to the present invention, in the case where there are a plurality of image capturing units, even if the brightness of the external environment changes, image capture by each of image capturing units can be performed with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-111680, filed Jun. 1, 2015 which is hereby incorporated by reference herein in its entirety.

What is claimed is:

1. An information processing apparatus comprising:
a luminance value obtaining unit configured to obtain a first luminance value of a first captured image of an external environment and a second luminance value of a second captured image of the external environment, wherein the first captured image is captured by a first image capturing unit for obtaining position and orientation of a head-mounted type display apparatus and the second captured image is captured by a second image capturing unit for capturing an image of the external environment on which a computer graphics image is superimposed;
a parameter obtaining unit configured to obtain a first tracking parameter and a second tracking parameter corresponding to a change in brightness of the external environment, the first tracking parameter indicating a first time difference from when the brightness of the external environment changes until a start of automatic exposure control by the first image capturing unit to track the change in brightness of the external environment, the second tracking parameter indicating a second time difference from when the brightness of the external environment changes until a start of automatic exposure control by the second image capturing unit to track the change in brightness of the external environment, and the first time difference from when the brightness of the external environment changes until the start of automatic exposure control by the first image capturing unit for obtaining position and orientation of the head-mounted type display apparatus is less than the second time difference from when the brightness of the external environment changes until the start of automatic exposure control by the second image capturing unit for capturing the image of the external environment on which the computer graphics image is superimposed; and
a setting unit configured to set a first image capturing parameter for the first image capturing unit based on the first luminance value and the obtained first tracking parameter and a second image capturing parameter for the second image capturing unit based on the second luminance value and the obtained second tracking parameter.

2. The information processing apparatus according to claim 1, further comprising:
a detection unit configured to detect an orientation of the first image capturing unit;
a determination unit configured to determine a photometric method based on the orientation of the first image capturing unit; and
an obtaining unit configured to obtain, based on a luminance value of a captured image of the first image capturing unit and on the photometric method, an integrated value of the luminance value,
wherein the setting unit sets the first image capturing parameter for the first image capturing unit based on the integrated value of the luminance value and the first tracking parameter.

3. The information processing apparatus according to claim 2,
wherein the detection unit further detects an orientation of a third image capturing unit that is different from the first image capturing unit, and
the information processing apparatus further includes a control unit configured to switch to synchronized control or separate control of the first image capturing unit and the third image capturing unit, based on the orientation of the first image capturing unit and the orientation of the third image capturing unit.

4. The information processing apparatus according to claim 3,
wherein the first image capturing unit is an image capturing unit for obtaining a position and orientation of the information processing apparatus, and
the second image capturing unit is an image capturing unit for experiencing mixed reality, and
the third image capturing unit is an image capturing unit for obtaining a position and orientation of the information processing apparatus.

5. The information processing apparatus according to claim 1, further comprising:
a determination unit configured to determine a photometric method; and
an obtaining unit configured to obtain, based on a luminance value of a captured image of the second image capturing unit and on the photometric method, an integrated value of the luminance value,
wherein the setting unit sets the second image capturing parameter for the second image capturing unit based on the integrated value of the luminance value and the second tracking parameter.

6. The information processing apparatus according to claim 1,
wherein the first tracking parameter corresponding to the first image capturing unit is different from the second tracking parameter corresponding to the second image capturing unit.

7. The information processing apparatus according to claim 1,
wherein the setting unit sets the first image capturing parameter after a predetermined time corresponding to the first tracking parameter has elapsed and sets the second image capturing parameter after a predetermined time corresponding to the second tracking parameter has elapsed.

8. The information processing apparatus according to claim 1,
wherein at least one of the first image capturing parameter and the second image capturing parameter is at least one of a shutter speed and a gain.

9. The information processing apparatus according to claim 1,
wherein the information processing apparatus is the head-mounted type display apparatus.

10. An image processing system comprising an information processing apparatus and an image processing apparatus that is wire-connected or wirelessly-connected to the information processing apparatus, the information processing apparatus including:
- a luminance value obtaining unit configured to obtain a first luminance value of a first captured image of an external environment and a second luminance value of a second captured image of the external environment, wherein the first captured image is captured by a first image capturing unit for obtaining position and orientation of a head-mounted type display apparatus and the second captured image is captured by a second image capturing unit for capturing an image of the external environment on which a computer graphics image is superimposed;
- a parameter obtaining unit configured to obtain a first tracking parameter and a second tracking parameter corresponding to a change in brightness of the external environment, the first tracking parameter indicating a first time difference from when the brightness of the external environment changes until a start of automatic exposure control by the first image capturing unit to track the change in brightness of the external environment, the second tracking parameter indicating a second time difference from when the brightness of the external environment changes until a start of automatic exposure control by the second image capturing unit to track the change in brightness of the external environment, and the first time difference from when the brightness of the external environment changes until the start of automatic exposure control by the first image capturing unit for obtaining position and orientation of the head-mounted type display apparatus is less than the second time difference from when the brightness of the external environment changes until the start of automatic exposure control by the second image capturing unit for capturing the image of the external environment on which the computer graphics image is superimposed; and
- a setting unit configured to set a first image capturing parameter for the first image capturing unit based on the first luminance value and the obtained first tracking parameter and a second image capturing parameter for the second image capturing unit based on the second luminance value and the obtained second tracking parameter.

11. A method for controlling an information processing apparatus, comprising:
- obtaining a first luminance value of a first captured image of an external environment and a second luminance value of a second captured image of the external environment, wherein the first captured image is captured by a first image capturing unit for obtaining position and orientation of a head-mounted type display apparatus and the second captured image is captured by a second image capturing unit for capturing an image of the external environment on which a computer graphics image is superimposed;
- obtaining a first tracking parameter and a second tracking parameter corresponding to a change in brightness of the external environment, the first tracking parameter indicating a first time difference from when the brightness of the external environment changes until a start of automatic exposure control by the first image capturing unit to track the change in brightness of the external environment, the second tracking parameter indicating a second time difference from when the brightness of the external environment changes until a start of automatic exposure control by the second image capturing unit to track the change in brightness of the external environment, and the first time difference from when the brightness of the external environment changes until the start of automatic exposure control by the first image capturing unit for obtaining position and orientation of the head-mounted type display apparatus is less than the second time difference from when the brightness of the external environment changes until the start of automatic exposure control by the second image capturing unit for capturing the image of the external environment on which the computer graphics image is superimposed; and
- setting a first image capturing parameter for the first image capturing unit based on the first luminance value and the obtained first tracking parameter and a second image capturing parameter for the second image capturing unit based on the second luminance value and the obtained second tracking parameter.

12. A non-transitory computer-readable storage medium storing a computer program for causing a computer to execute a method for controlling an information processing apparatus, comprising:
- obtaining a first luminance value of a first captured image of an external environment and a second luminance value of a second captured image of the external environment, wherein the first captured image is captured by a first image capturing unit for obtaining position and orientation of a head-mounted type display apparatus and the second captured image is captured by a second image capturing unit for capturing an image of the external environment on which a computer graphics image is superimposed;
- obtaining a first tracking parameter and a second tracking parameter corresponding to a change in brightness of the external environment, the first tracking parameter indicating a first time difference from when the brightness of the external environment changes until a start of automatic exposure control by the first image capturing unit to track the change in brightness of the external environment, the second tracking parameter indicating a second time difference from when the brightness of the external environment changes until a start of automatic exposure control by the second image capturing unit to track the change in brightness of the external environment, and the first time difference from when the brightness of the external environment changes until the start of automatic exposure control by the first image capturing unit for obtaining position and orientation of the head-mounted type display apparatus is less than the second time difference from when the brightness of the external environment changes until the start of automatic exposure control by the second image capturing unit for capturing the image of the external environment on which the computer graphics image is superimposed; and
- setting a first image capturing parameter for the first image capturing unit based on the first luminance value and the obtained first tracking parameter and a second image capturing parameter for the second image capturing unit based on the second luminance value and the obtained second tracking parameter.

* * * * *